(12) United States Patent
Rathi

(10) Patent No.: US 8,180,733 B2
(45) Date of Patent: May 15, 2012

(54) SELECTIVE DURABILITY IN A DIRECTORY DATABASE

(75) Inventor: Pradeep Kumar Rathi, Bangalore (IN)

(73) Assignee: Novell, Inc., Provo, UT (US)

( * ) Notice: Subject to any disclaimer, the term of this patent is extended or adjusted under 35 U.S.C. 154(b) by 538 days.

(21) Appl. No.: 12/407,075

(22) Filed: Mar. 19, 2009

(65) Prior Publication Data

US 2010/0241676 A1 Sep. 23, 2010

(51) Int. Cl.
*G06F 7/00* (2006.01)
*G06F 17/00* (2006.01)

(52) U.S. Cl. ...................................... 707/634
(58) Field of Classification Search ................... 707/634
See application file for complete search history.

(56) References Cited

U.S. PATENT DOCUMENTS

| | | | |
|---|---|---|---|
| 6,014,673 A | 1/2000 | Davis et al. | |
| 6,338,146 B1 | 1/2002 | Johnson et al. | |
| 7,028,219 B2 | 4/2006 | Johnson et al. | |
| 7,469,244 B2 | 12/2008 | Dettinger et al. | |
| 2004/0167912 A1* | 8/2004 | Tsui et al. | 707/100 |
| 2006/0277024 A1* | 12/2006 | Kloppmann et al. | 703/22 |
| 2010/0191930 A1* | 7/2010 | Groff et al. | 711/170 |

OTHER PUBLICATIONS

"Gartner: Oracle RAC moved to mainstream use", http://www.oracle.com/database/index.html, (Downloaded Mar. 12, 2009).
"MySQL Server Version Reference", http://dev.mysql.com/doc/mysqld-version-reference/en/index.html, (Mar. 11, 2009).
"Project: FLAIM Database Engine", http://forge.novell.com/modules/xfmod/project/?flaim, Novell, Inc., (2006).

* cited by examiner

*Primary Examiner* — Jacob F. Bétit
(74) *Attorney, Agent, or Firm* — Schwegman, Lundberg & Woessner, P.A.

(57) ABSTRACT

Selective durability in a directory database is presented. A directory database that provides durability processing includes a mechanism where selective attributes for directory resources can turn durability processing off. So, when a directory transaction is encountered having a durability processing turned off, the directory database processes that directory transaction without first flushing the directory transaction from memory to storage.

20 Claims, 3 Drawing Sheets

SELECTIVE DURABILITY IN A DIRECTORY DATABASE

BACKGROUND

Increasingly individuals and enterprises are conducting affairs over the World-Wide Web (WWW) and the Internet. Enterprises often have backend databases that capture transactions with consumers. For example, an airline has a centralized database that permits consumers to reserve seats on flights of the airline. Because multiple servers may be used to provide high-response and high-availability to the consumers, an airline will likely provide many frontend servers that are capable of accessing the central database. One obvious situation that occurs is if two separate consumers attempt to book a same seat on a same flight. To prevent this from happening, the separate servers communicate with one another via a two-phase commit protocol. So, before the centralized server commits to reserving a seat for a particular consumer the other servers acknowledge the commit and that the seat is being reserved for the particular consumer. Other distributed locking techniques may also be used to ensure that requested seat is not reserved or confirmed more than once.

In the previous example, another situation can arise with a distributed approach to performing transactions against a centralized database. Here, the database can fail before the seat is actually updated as being taken within the database. To ensure that this situation will not deny the consumer the seat that the airline committed to providing the consumer, the transaction is performed as a durable transaction.

Durability guarantees that transactions that have been committed to a database will permanently survive even if the database should fail before the database is actually updated. This is done by flushing the transaction log for the operation from memory to physical storage before the commitment is acknowledged. So, in the example, the centralized database first writes the reservation operation of the consumer to storage and flushes it from memory before the consumer receives an acknowledgement indicating that the seat was reserved. Once the flushed operation is on physical storage, the consumer receives the acknowledgement. Now, even if the database fails the consumer is assured that the seat reserved is his/her seat because the reservation operation can be replayed from the physical storage if the database fails when the database is brought back online.

One obvious drawback with durability is that the more frequently memory is flushed to storage, the slower performance becomes for users of the database. Often some data and certain types of operations that use durability do not have to do so and may not even be wanted by an enterprise. However, there is no way to turn durability on and off as desired.

Additionally, many enterprises' directories are essentially databases that are distributed and use durability to ensure commits and reliability to distributed users of the enterprise.

Thus, what are needed are improved techniques for selective durability to directory databases.

SUMMARY

In various embodiments, cluster-free techniques for selective durability in a directory database are presented. More specifically, and in an embodiment, a method is provided for selective directory database durability. A turn-durability-off setting is received for an attribute of a resource, which is being managed by a directory. Next, a listing is updated for purposes of assigning the turn-durability-off setting to the attribute. Subsequently, a directory transaction is detected that alters the attribute, and the directory transaction is passed to a directory database for processing. Moreover, the directory database is instructed to process the transaction without flushing the directory transaction from memory to storage in response to the turn-durability-off setting included in the listing.

DETAILED DESCRIPTION

Figure 1:
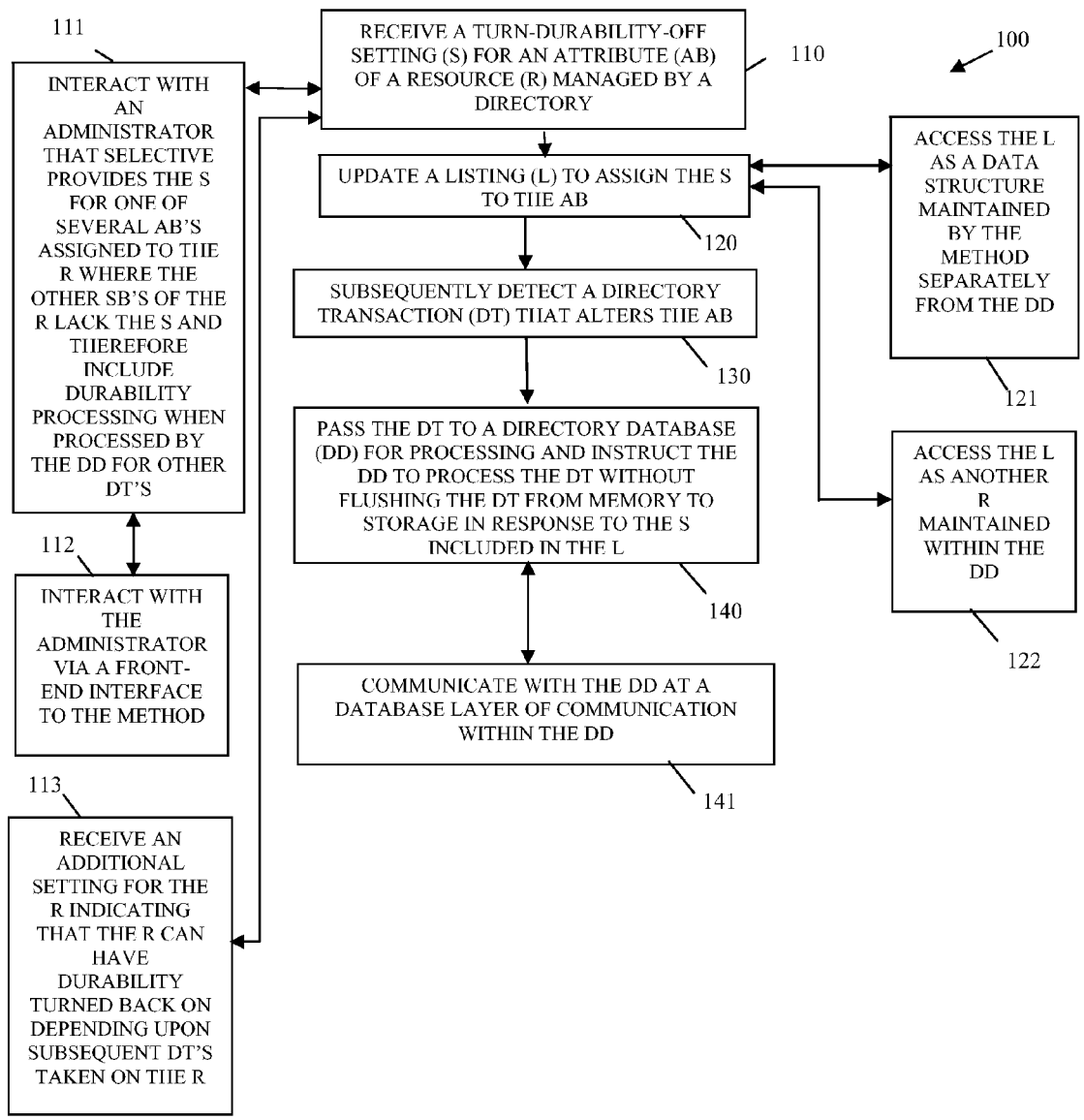
FIG. 1 is a diagram of a method for selective directory database durability, according to an example embodiment.

As used herein a "resource" is an addressable and uniquely distinguishable entity, which is represented within a network, such as but not limited to, a user, a service, a group, a website, a domain, a device, a file, a document, an image, a piece of music, a video, a presentation, custom-defined objects, and/or various combinations of these things, and the like.

Various aspects of this invention discuss usage of a directory service protocol. In an embodiment, that directory service protocol is a Lightweight Directory Access Protocol (LDAP), which is used for querying and modifying directory resources, such as services or objects, that execute or that are accessible within a directory using Transmission Control Protocol (TCP)/IP. It is noted that in other cases different directory service protocols can be used with the teachings presented herein and below.

A "directory" is a set of objects (services) having similar attributes and that are organized in a logical and hierarchical manner over a network. The hierarchy of the directory is often referred to as a "tree," which uses identifiers, supplied via the Directory Name System (DNS), for structuring and organizing various levels of the tree.

A "database" refers to an interface to content information associated with resources. The content includes metadata about the resources, such as identity information, access information, context information, and the like. The interface (directory service (discussed below)) permits resources and their content to be modified, created, and/or deleted from the database. So, a database may be viewed as an Application Programming Interface (API) to content maintained for resources within a network.

A "directory service" is a directory manager at a higher level interface than the underlying directory service protocol that is accessible by applications and users to manage and access a directory. In an embodiment, the directory service is eDirectory® distributed by Novell, Inc. of Provo, Utah.

"Durability" refers to processes used with the database that ensure that an operation is guaranteed to occur when acknowledged to a requestor of the operation. Here, in a distributed environment, when a requesting resource requests a modification to the database before the success of the operation is confirmed, the operation and request is flushed from memory of a device to storage. Once on storage, the request can be confirmed or acknowledged because the request and its operation can be processed even if the database fails before the operation is updated to the database. Essentially, the request and its operation are replayed from storage to the database when the database recovers from a failure.

A "transaction" as used herein refers to a single logical operation on portions of the content or data associated with a directory. Some transactions may be volatile, which means that the data is deleted or modified in some manner. Other transactions may be non volatile, which means that the data is not changed after the transaction, such as a read operation against the data.

According to an embodiment, the techniques presented herein are implemented in eDirectory® and/or proxy-based products that are distributed by Novell®, Inc. of Provo, Utah. Also, in some embodiments, the Operating System (OS) is Linux, such as Suse® Linux, distributed by Novell®, Inc. of Provo, Utah.

Of course, the embodiments of the invention can be implemented in a variety of architectural platforms and products. Any particular architectural layout, product, or implementation presented herein is provided for purposes of illustration and comprehension only and is not intended to limit various aspects of the invention.

It is within this initial context, that various embodiments of the invention are now presented with reference to the FIGS. 1-4.

FIG. 1 is a diagram of a method 100 for selective directory database durability, according to an example embodiment. The method 100 (hereinafter "selective durability service") is implemented as instructions in a machine-accessible and computer-readable storage medium. The instructions when executed by one or more network-based machines (processing devices, processors, computers, etc.) perform the processing depicted in FIG. 1. The one or more network-based machines are specifically configured for processing the selective durability service. Also, the selective durability service is also operational over and processes within a network. The network may be wired, wireless, or a combination of wired and wireless.

It is noted that each of the processing descriptions presented herein and below of the selective durability service are executed on the one or more network-based machines.

Also, the selective durability service provides a perspective that permits the selective durability service to be initially configured for selective durability processing as well as proceeding with durability processing.

At 110, the selective durability service receives a turn-durability-off setting for an attribute of a resource that is being managed by a directory. For example, an attribute for last-successful-login for a user identified as resource "Pradeep" includes a setting for turn-durability-off. So, when Pradeep (resource) subsequently and successfully logs into an enterprise network (that runs the selective durability service) processing can proceed as identified below.

In an embodiment, at 111, the selective durability service dynamically interacts with an administrator. The administrator selectively provides the turn-durability-off setting for one of several attributes assigned to the resource. The other attributes of the resource lack the turn-durability-off setting; so, durability processing is turned on when these other attributes are processed by the directory database (discussed below) for other subsequent directory transactions. Continuing with the example presented at 110, Pradeep (resource) may also include an attribute for email-address that does not include the turn-durability-off setting; thus, when a subsequent directory transaction is received that modifies the email-address attribute; durability processing by the directory database takes place. That is, the directory database will flush the subsequent directory transaction with the modified email-address attribute to physical storage before the subsequent directory transaction is processed by the directory database and acknowledges the update back to Pradeep as soon as the directory transaction and the modified email-address attribute successfully writes to the physical storage.

Continuing with the embodiment at 111 and at 112, the selective durability service interacts with the administrator via a front-end interface to the method 100 (selective durability service). Therefore, the selective durability service includes a command-driven or Graphical User Interface (GUI)-based interface that permits the administrator to interactively activate a turn-durability-off setting for selective attributes of a resource.

In another case, at 113, the selective durability service receives an additional setting for the resource indicating that the resource can have durability processing turned back on depending upon subsequent directory transactions taken on the resource. Here, a policy may indicate that a particular attribute of a resource can dispense with durability processing for one type of directory transaction but requires durability processing when another type of directory transaction is detected. For example, the last-successful-login attribute may not require durability processing for a login transaction that occurs within a secure network of an enterprise but may require durability processing for a login transaction that occurs via a remote login transaction where Pradeep is logging into the secure network from an insecure network, since the Internet Protocol (IP) address of where Pradeep originates the request may need to be recorded and captured for audit tracking within the enterprise.

So, durability processing can be turned on and off as desired by resources (e.g., users, administrators, automated services).

At 120, the selective durability service updates a listing to assign the turn-durability-off setting to the selected attribute of the resource. Here, the selective durability service manages how and what mechanism is being used to subsequently detect the setting on the selected attribute. This can be done in a variety of manners.

For example, at 121, the selective durability service accesses the listing as a data structure maintained by the method 100 (selective durability service). Here, the data structure is maintained by the selective durability service outside the directory or separate and apart from the directory. Thus, the data structure may reside in memory, in local storage, and/or in memory and storage within a local processing environment and local processor associated with the selective durability service.

In an alternative situation, at 122, the selective durability service accesses the listing as another resource that is maintained within the directory database. Here, the listing is actively maintained by the selective durability service within the directory via the directory database.

At 130, the selective durability service subsequently (subsequent to the processing at 110-122) and dynamically detects a directory transaction that is attempting to alter the attribute identified at 110. The selective durability service identifies the type of operation being attempted against the directory along with the parameters associated therewith that include an identifier for the resource and the attribute. In response to this, the selective durability service determines that the operation is a volatile (modifying) operation and that the resource attribute is included in the listing and has the turn-durability-off setting associated with it.

At 140, the selective durability service dynamically passes the directory transaction to the directory database for processing and further also instructs the directory database to process the directory transaction without flushing the directory transaction from memory to storage. Again, the selective durability service knows how to do this by identifying the resource and its attribute in the listing and identifying that an entry within the listing includes the turn-durability-off setting.

According to an embodiment, at 141, the selective durability service communicates with the directory database at a database layer of communication within the directory database. So, the processing of the selective durability service is integrated and coupled to the database layer. This permits the selective durability service to inspect and forward directory transactions to the directory database and provide instructions regarding whether durability processing is to take place with any given directory transaction or whether durability processing is to not take place with any given directory transaction.

One now fully appreciates how selective attributes of directory resources can include a setting to turn durability processing on and off while other attributes of the same resource or other resources have the contrary processing being performed (so if durability processing is on for one attribute of a resource, durability processing can simultaneously be off for another attribute of the same resource). When durability processing is selectively turned off, the directory database processes the given directory transaction without first flushing the directory transaction from storage to memory. Such selective durability processing can improve the processing throughput of directory transactions. Especially, in large scale distributed directories.

Figure 2:
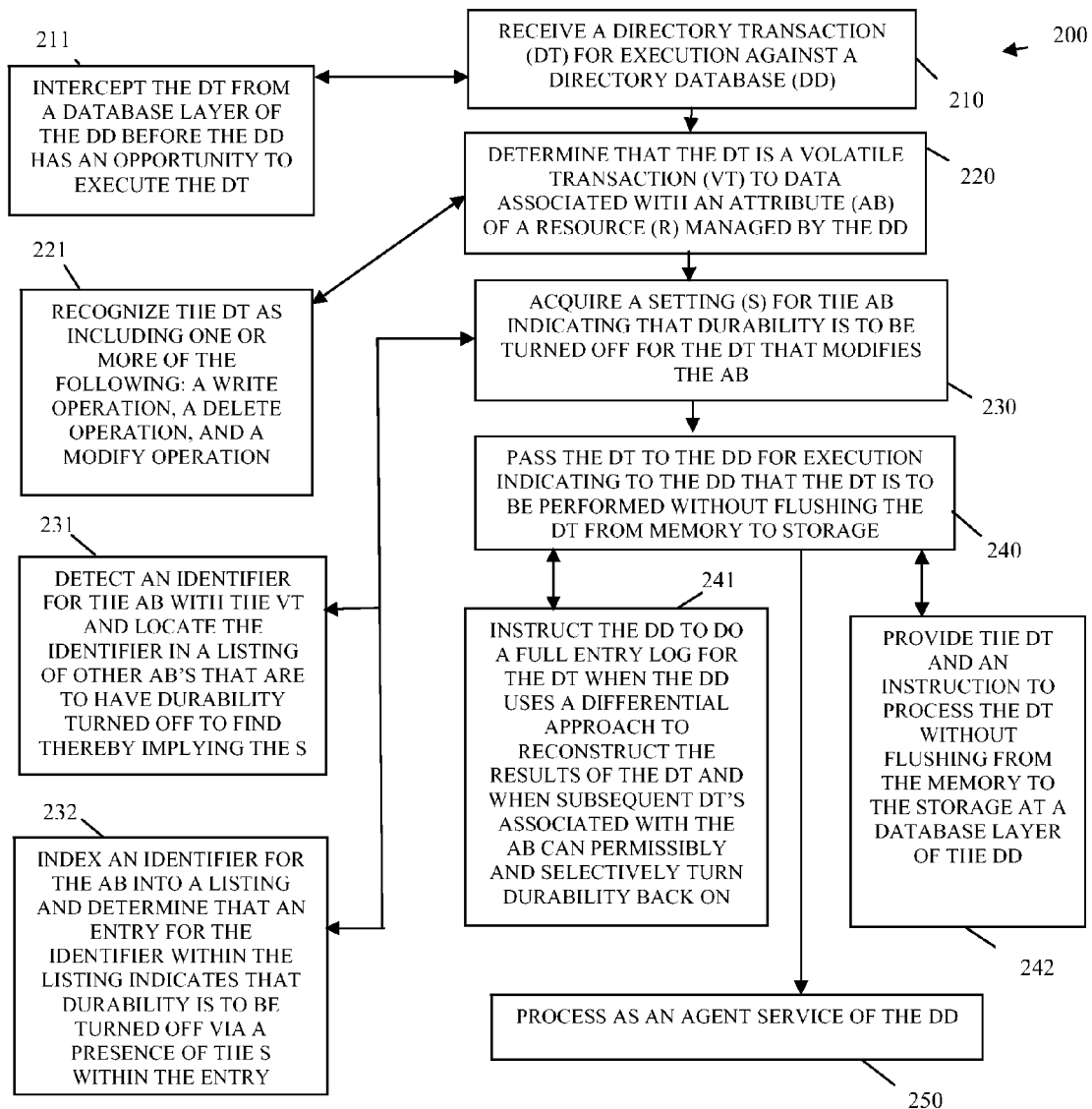
FIG. 2 is a diagram of another method for selective directory database durability, according to an example embodiment.

FIG. 2 is a diagram of another method 200 for selective directory database durability, according to an example embodiment. The method 200 (herein after referred to as "directory service") is implemented in a machine-accessible and computer-readable storage medium as instructions, which when accessed by one or more machines (processors, etc.) perform the processing depicted in the FIG. 2; the directory service is also operational over a network; and the network may be wired, wireless, or a combination of wired and wireless. The one or more processors are specifically configured to execute the directory service. Moreover, it is noted that each of the processing detailed below with respect to the directory service is executed on the one or more processors.

The directory service presents another and in some cases an enhanced perspective of the selective durability service represented by the method 100 of the FIG. 1 and presented in detail above.

At 210, the directory service receives a directory transaction for execution against a directory database. Receipt of the directory transaction can occur in a variety of manners.

For example, at 211, the directory service intercepts the directory transaction within a database layer of communication of a directory database before the directory database has an opportunity to execute the directory transaction. Thus, the directory service is integrated into the database layer of communication so as to permit interception and receipt of incoming directory transactions occurring over the network from requestors (types of resources, such as users and/or automated services).

In another case, the directory service can be configured as a reverse proxy for the directory database, such that requestors and the directory database are unaware of the presence of the directory service. Here, processing may not be as efficiently done as it is at 211 but the directory service can be integrated into existing directories with minimal configuration and effort.

At 220, the directory service determines that the directory transaction is a volatile transaction to data associated with an attribute of a resource, which is being managed by the directory database. Examples for initially configuring this scenario for detection and for detecting this scenario were provided in detail above with reference to the method 100 of the FIG. 1.

According to an embodiment, at 221, the directory service recognizes the directory transaction as being a write operation, a delete operation, and/or a modify operation. The write operation can include creation. Essentially, any operation that alters values associated with the attribute that is flagged for the resource can be detected by the directory service. Policy or initial configuration of the directory service can be used to permit the directory service to dynamically recognize the volatile transactions or operations.

At 230, the directory service acquires a setting for the attribute, which indicates that durability processing is to be turned off for the directory transaction that was recognized and that is attempting to modify the attribute. Again, example processing for achieving this was presented in detail above with reference to the method 100 of the FIG. 1.

For example, at 231, the directory service detects an identifier for the attribute with the volatile transaction and locates that identifier in a listing of other attributes that are to have durability processing turned off. That is, the mere presence of the identifier for the attribute within the listing implies or informs the directory service that durability processing is to be turned off. Essentially, the listing includes an entry for each resource and an attribute identifier combination, which if present instructs the directory service to turn durability processing off at the directory database level of processing.

In another case, at 232, the directory service indexes and identifier for the attribute into a listing to determine that an entry, within the listing, for the identifier indicates that durability processing is to be turned off via a presence of the setting within the entry for the identifier. So, unlike the processing at 231 the processing at 232 uses the directory database's entry listing for the resource and its identifier to include a setting value on an attribute or a property of the attribute, which if set to turn-durability-processing-off indicates to the directory service that durability processing can be dispensed with for this particular attribute of the resource.

At 240, the directory service passes the directory transaction for execution to the directory database and also concurrently indicates to the directory database that the directory database is to process the directory transaction without first flushing the directory transaction from memory to physical storage. Since the directory transaction is processed without memory being flushed to physical storage, the transaction experiences a more rapid response from the directory database and improves overall processing throughput of the directory database for other concurrent requests being made by other requestors of the directory over the network.

According to an embodiment, at 241, the directory service instructs the directory database to do a full entry log for the directory transaction when the directory database uses a differential approach to reconstruct the results of the directory transaction and when subsequent directory transactions (associated with the attribute) can permissibly and selectively turned back on. That is, if version control of the directory database uses an approach where only the differences and the operation to apply are recorded in physical storage, then should a subsequent directory transaction on the attribute turn durability back on, then the directory database will not have sufficient information to rebuild what occurred before. So, the processing at 241 ensures that if the directory database is using a differential approach and the attribute can turn durability back on depending upon the context or type of directory transaction being processed, then the directory service tells or instructs the directory database to do full entry logs on changes for directory transactions that have durability processing turned off. This permits the directory database to use the differential approach against subsequent directory transactions that can turn durability processing back on after it was previously turned off via the processing at 210-240.

In another situation, at 242, the directory service provides the directory transaction and the instruction for processing that directory transaction without durability processing (e.g., process the directory transaction without flushing it from the memory to the storage first) to the directory database at a database layer of communication within the directory database. That is, the directory service is integrated within the database communication layer of the directory.

In another situation, at 250, the entire directory service and its processing is implemented and is executed as an agent service of the directory database. In other words, the directory service is part of the directory system including the API associated with the directory database.

Figure 3:
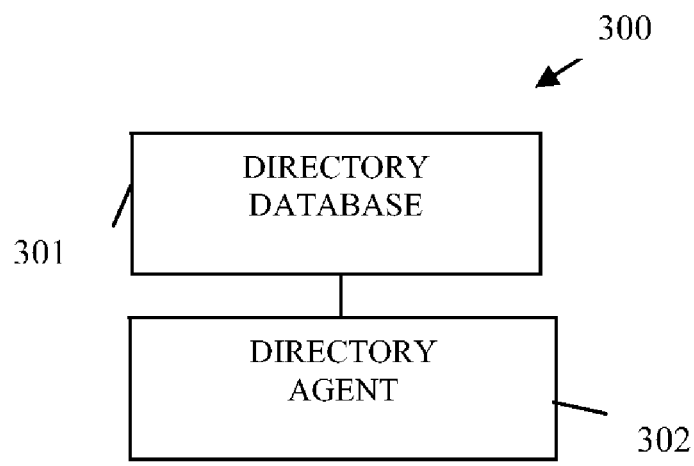
FIG. 3 is a diagram of a selective durability directory database system, according to an example embodiment.

FIG. 3 is a diagram of a selective durability directory database system 300, according to an example embodiment. The selective durability directory database system 300 is implemented in a machine-accessible and computer-readable storage medium as instructions, which when executed by one or more machines (computers or processor-enabled devices) perform, among other things, the processing depicted in the methods 100 and 200 of the FIGS. 1 and 2, respective. The selective durability directory database system 300 is also operational over a network; the network may be wired, wireless, or a combination of wired and wireless.

The selective durability directory database system 300 includes a directory database 301 and a directory agent 302. Each of these components and their interactions with one another will now be discussed in turn.

The directory database 301 is implemented in a computer-readable storage medium and executes on one or more processors of the network. Example aspects of the directory database 301 were presented in detail above with reference to the methods 100 and 200 of the FIGS. 1 and 2, respectively.

In an embodiment, the directory database 301 is a directory manager that is modified to achieve the teachings presented herein and above, such as an enhanced version of eDirectory®, which is distributed by Novell, Inc., of Provo, Utah. Of course it is understood that the directory and corresponding directory database 301 can be any modified and enhanced version of existing directories or directory managers that are modified and enhanced to interact with the directory agent 302 in the manners discussed herein above and below.

The directory agent 302 is implemented in a computer-readable storage medium and also executes on one or more processors of the network. Example processing associated with the directory agent 302 was presented in detail above with reference to the methods 100 and 200 of the FIGS. 1 and 2, respectively.

During operation, the directory database 301 interacts with the directory agent 302 for purposes of processing directory transactions and managing directory resources. The directory agent 302 determines at some point during processing that a particular directory transaction is associated with a setting for an attribute of a resource. The setting is an indication to the directory agent 302 that durability processing is to be turned off for that particular directory transaction. The directory agent 302 passes the particular directory transaction to the directory database 301 with an instruction that the directory database 301 is to process the particular directory transaction without flushing that particular directory transaction from memory to storage (durability processing selectively and dynamically configured to be turned off for this particular directory transaction having this particular attribute for this particular resource).

In an embodiment, the directory agent 302 determines that the setting is set for the attribute by locating an entry in a listing for an identifier associated or assigned to the attribute. This scenario was discussed above with reference to the method 100 of the FIG. 1.

In another case of the previous embodiment, the directory agent 302 maintains the listing within the directory database 301. Again, this scenario was discussed above with reference to the method 100 of the FIG. 1.

Still continuing with the listing embodiment, in an alternative situation to the very last embodiment, the directory agent 302 maintains the listing independent and separate from the purview of the directory database 301. Once again, this scenario was discussed above with reference to the method 100 of the FIG. 1.

According to an embodiment, the setting is originally provided, set, and/or configured by an administrator. The administrator selectively provides the setting for the attribute when other attributes associated with the resource do not including the setting. The other attributes that do not have the setting ensure that other directory transactions that use these other attributes will have the durability processing turned on. So, the other directory transactions are to be flushed from the memory to the storage by the directory database 301 before those other directory transactions are processed by the directory database 301.

In another case, the directory agent 302 also instructs the directory database 301 to do a full entry log on the particular directory transaction because subsequent directory transactions that utilize the attribute can entail selectively turning back on durability processing. This situation was discussed in detail above with reference to the methods 100 and 200 of the FIGS. 1 and 2, respectively.

Figure 4:
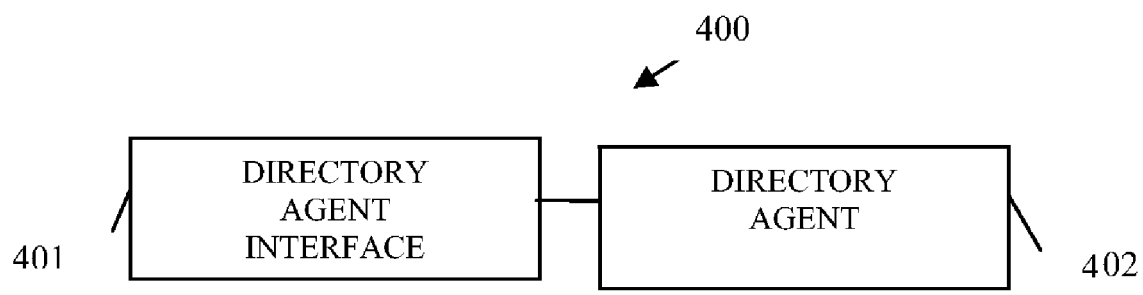
FIG. 4 is a diagram of another selective durability directory database system, according to an example embodiment.

FIG. 4 is a diagram of another selective durability directory database system 400, according to an example embodiment. The selective durability directory database system 400 is implemented as instructions on or within a machine-accessible and computer-readable storage medium. The instructions when executed by one or more machines (processor-enabled devices) perform, inter alia; the processing depicted with respect to the methods 100, 200 of the FIGS. 1-2, respectively, and the system 300 of the FIG. 3. The selective durability directory database system 400 is also operational over a network and the network may be wired, wireless, or a combination of wired and wireless.

The selective durability directory database system 400 is another and in some cases enhanced perspective to the selective durability directory database system 300 represented by the FIG. 3 and presented above.

The selective durability directory database system 400 includes a directory agent interface 401 and a directory agent 402. Each of these components and their interactions with one another will now be discussed in turn.

The directory agent interface 401 is implemented in a computer-readable storage medium and executes or processes on a processor of the network. Example aspects of the directory agent interface 401 were presented above with reference to the method 100 of the FIG. 1.

The directory agent interface 401 interacts with an administrator to selectively provide or configure a setting for particular attributes of a resource. The setting indicates that durability processing for a directory database is to be turned off for these particular attributes during volatile directory transactions or for specific directory transactions.

According to an embodiment, the directory agent interface 401 maintains a listing of the particular attributes having the setting for the directory agent 402 to dynamically access and inspect on receipt of directory transactions.

In an alternative situation, the directory agent interface 401 updates entries in the directory database for resources to include the setting on the particular attributes.

So, the listing can be maintained within the directory or independent of the directory.

The directory agent 402 is implemented in a computer-readable storage medium and executes or processes on the same processor as the directory agent interface 401 or an entirely different processor of the network. Example processing associated with the directory agent 402 was presented in detail above with reference to the methods 100 and 200 of the FIGS. 1 and 2, respectively, and with reference to the system 300 of the FIG. 3.

The directory agent 402 inspects directory transactions that are directed to the directory database for processing. When a particular directory transaction includes the setting for one of the particular attributes having the setting, the directory agent 402 instructs the directory database to process or execute the particular directory transaction without flushing that particular directory transaction from memory to storage (that is, without durability processing turned on).

One now fully appreciates how selective attribute-based durability processing can be achieved within directory databases. This can significantly improve the processing throughput of large-scale distributed directories by reducing Input/Output (I/O) instructions that flush to storage, when such instructions are not needed or desired by an administrator of a network.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method performed by one or more processors executing instructions stored on a computer-readable storage medium, the method comprising:
   receiving a turn-durability-off setting for an attribute of a resource managed by a directory, interacting with an administrator via a front-end interface to the directory that selectively provides the turn-durability-off setting for one of several attributes assigned to the resource where the other attributes of the resource lack the turn-durability-off setting and therefore include durability processing when processed by a directory database for other directory transactions;
   updating a listing to assign the turn-durability-off setting to the attribute; subsequently detecting a directory transaction that alters the attribute; and
   passing the directory transaction to the directory database for processing and instructing the directory database to process the directory transaction without flushing the directory transaction from memory to storage in response to the turn-durability-off setting included in the listing.

2. The method of claim 1, wherein receiving further includes receiving an additional setting for the resource indicating that the resource can have durability turned back on depending upon subsequent directory transactions taken on the resource.

3. The method of claim 1, wherein updating further includes accessing the listing as a data structure maintained by the method separately from the directory database.

4. The method of claim 1, wherein passing further includes communicating with the directory database at a database layer of communication within the directory database.

5. A method performed by one or more processors executing instructions stored on a computer-readable storage medium, the method comprising:
   receiving a turn-durability-off setting for an attribute of a resource managed by a directory;
   accessing a listing as another resource maintained within the directory database and updating the listing to assign the turn-durability-off setting to the attribute;
   subsequently detecting a directory transaction that alters the attribute; and
   passing the directory transaction to the directory database for processing and instructing the directory database to process the directory transaction without flushing the directory transaction from memory to storage in response to the turn-durability-off setting included in the listing.

6. A method performed by one or more processors executing instructions stored on a computer-readable storage medium, the method comprising:
   receiving a directory transaction for execution against a directory database;
   determining that the directory transaction is a volatile transaction to data associated with an attribute of a resource managed by the directory database;
   acquiring a setting for the attribute indicating that durability is to be turned off for the directory transaction that modifies the attribute, wherein acquiring further includes indexing an identifier for the attribute into a listing and determining that an entry for the identifier within the listing indicates that durability is to be turned off via a presence of the setting within the entry; and
   passing the directory transaction to the directory database for execution indicating to the directory database that the directory transaction is to be performed without flushing the directory transaction from memory to storage.

7. The method of claim 6, wherein receiving further includes intercepting the directory transaction from a database layer of the directory database before the directory database has an opportunity to execute the directory transaction.

8. The method of claim 6, wherein determining further includes recognizing the directory transaction as including one or more of the following: a write operation, a delete operation, and a modify operation.

9. The method of claim 6, wherein acquiring further includes detecting an identifier for the attribute with the volatile transaction and locating the identifier in a listing of other attributes that are to have durability turned off thereby implying the setting.

10. The method of claim 6, wherein passing further includes instructing the directory database to do a full entry log for the directory transaction when the directory database uses a differential approach to reconstruct the results of the directory transaction and when subsequent directory transactions associated with the attribute can permissibly and selectively turn durability back on.

11. The method of claim 6, wherein passing further includes providing the directory transaction and an instruction to process the directory transaction without flushing from the memory to the storage at a database layer of the directory database.

12. The method of claim 6, further comprising, processing the method as an agent service of the directory database.

13. A system including one or more processors and instructions stored on a non-tangible computer-readable storage medium, the instructions adapted to be executed by the one or more processors, comprising:
 a directory database implemented in a computer-readable storage medium and to execute on one or more processors of a network;
 a directory agent implemented in a computer-readable storage medium and to execute on a processor of the network;
 wherein the directory database interacts with the directory agent to process directory transactions, and wherein when the directory agent determines that a particular directory transaction is associated with a setting for an attribute of a resource that is to have durability processing turned off, and wherein the directory agent passes the particular directory transaction to the directory database with an instruction to process the particular directory transaction without flushing it from memory to storage, and wherein the directory agent determines that the setting is set for the attribute by locating an entry in a listing for an identifier associated with the attribute.

14. The system of claim 13, wherein the listing is maintained within the directory database.

15. The system of claim 13, wherein the listing is maintained by the directory agent independent of the directory database.

16. The system of claim 13, wherein the setting was originally provided by an administrator that selectively provided the setting for the attribute when other attributes associated with the resource did not include the setting ensuring that other directory transactions that utilize the other attributes have the durability processing turned on, thus, the other directory transactions are to be flushed from the memory to the storage by the directory database before processed by the directory database.

17. A system including one or more processors and instructions stored on a non-tangible computer-readable storage medium, the instructions adapted to be executed by the one or more processors comprising:
 a directory database implemented in a computer-readable storage medium and to execute on one or more processors of a network;
 a directory agent implemented in a computer-readable storage medium and to execute on a processor of the network;
 wherein the directory database interacts with the directory agent to process directory transactions, and wherein when the directory agent determines that a particular directory transaction is associated with a setting for an attribute of a resource that is to have durability processing turned off, and wherein the directory agent passes the particular directory transaction to the directory database with an instruction to process the particular directory transaction without flushing it from memory to storage, wherein the directory agent also instructs the directory database to do a full entry log on the particular directory transaction because subsequent directory transactions that utilize the attribute turn the durability processing back on.

18. A system including one or more processors and instructions stored on a non-tangible computer-readable storage medium, the instructions adapted to be executed by the one or more processors, comprising:
 a directory agent interface implemented in a computer-readable storage medium and to execute on a processor of a network; and
 a directory agent implemented in a computer-readable storage medium and to execute on the processor or another processor of the network;
 wherein the directory agent interface interacts with an administrator to selectively provide a setting for particular attributes of resources, where other attributes for the resources lack the turn-durability off setting and therefore include durability processing when processed by the directory database for other directory transactions, the setting indicates that durability processing for a directory database is to be turned off, and wherein the directory agent inspects directory transactions directed to the directory database and when a particular directory transaction includes the setting for one of the particular attributes, the directory agent instructs the directory database to process the particular directory transaction without flushing that particular directory transaction from memory to storage.

19. The system of claim 18, wherein the directory agent interface maintains a listing of the particular attributes having the setting for the directory agent to access and inspect.

20. The system of claim 19, wherein the directory agent interface updates entries in the directory database for resources to include the setting on the particular attributes.

* * * * *